3,122,524
POLYMERIZATION OF ACETALDEHYDE
Jerry N. Koral, Stamford, Conn., and Benjamin W. R. Song, New York, N.Y., assignors to American Cyanamid Company, New York, N.Y., a corporation of Maine
No Drawing. Filed Apr. 10, 1961, Ser. No. 101,686
4 Claims. (Cl. 260—67)

This invention relates to a process for the polymerization of various aldehydes. Further, this invention relates to the polymerization of various aldehydes utilizing a novel catalyst system. Still further, this invention relates to the polymerization of certain aldehydes utilizing various tertiary phosphines having a pKa of at least about 8.0.

It is an object of the present invention to produce superior, tough, stable polymers of various aldehydes. It is a further object of this invention to produce superior, tough, stable polymers of various aldehydes by polymerizing them with various tertiary phosphine catalysts which have a pKa of at least about 8.0. Other objects will be obvious to one skilled in the art upon reading the more detailed description set forth hereinbelow.

It is well-known in the art that tertiary phosphines are useful catalysts for the polymerization of materials such as acrylamide and acrylonitrile (see U.S. Patent 2,675,372). It is also known that various tertiary phosphines such as triethyl, triphenyl, tritolyl and trixylyl phosphines can be used for the polymerization of formaldehyde (see U.S. Patents 2,968,994 and 2,828,286).

However, it has not previously been known that certain tertiary phosphines may be used to polymerize other aldehydes. The prior art is silent in respect to the use of tertiary phosphines as catalysts for the polymerization of any aldehydes other than formaldehyde.

We have discovered that certain tertiary phosphines, having a specific pKa value, possess the unexpected property of being able to catalyze the polymerization of aldehydes other than formaldehyde. Specifically, we have found that compounds corresponding to the formula

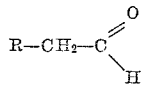

wherein R is a substituent selected from the group consisting of hydrogen, an acyclic, linear, alkyl radical having 1 to 6 carbon atoms and a phenyl radical, may be polymerized, utilizing as the catalyst for said polymerization, any tertiary phosphine having a pKa of at least about 8.0.

Examples of the compounds which are represented by the above-mentioned formula include acetaldehyde, propionaldehyde, butyraldehyde, amyl aldehyde, hexylaldehyde, heptylaldehyde, octylaldehyde phenylacetaldehyde, and the like.

The process disclosed herein has many advantages, one of which is, for example, that the tertiary phosphine catalysts are very easily handled, that is to say, they are not spontaneously combustible in air. Further, the process can be carried out at atmospheric pressure with a rapid rate of polymerization. Also the presence of a small amount of oxygen will not materially affect the reaction and therefore conditions in respect to vacuum and oxygen exclusion do not have to be as closely scrutinized as in the past in respect to formaldehyde polymerization. Finally, the polymer is very easily recovered from the reaction vessel in that it settles to the bottom of said vessel and is easily isolated by filtration, etc.

The reaction is preferably carried out by adding the monomer in dropwise increments, to a catalyst solution which is undergoing vigorous agitation, utilizing a delayed addition technique. The polymer forms instantaneously. By this method of addition of the monomer, high conversions of the monomer to polymer can be obtained.

It is critical in the instant invention that the monomer, catalyst and solvent be substantially pure. In respect to the monomer, it is preferred that a monomer that has been freshly prepared be used. This, for instance, is usually accomplished by decomposition of paraldehyde to acetaldehyde. However, when the other aldehyde monomers polymerizable by this process are treated, they should first be dried over a material such as magnesium sulfate and distilled. This procedure is repeated again just before the aldehyde is polymerized. With respect to the solvent and catalyst used, it is preferred that these materials also be substantially pure, i.e., substantially anhydrous and substantially oxygen free. By "substantially anhydrous" is meant containing less than about 1% water, separately or in combination. By "substantially oxygen free" is meant containing less than about 2% oxygen.

The molecular weights of the polymers of the present invention are not critically important, however the more practical polymers are obtained when the polymers have attained molecular weights of about 4000 to 8000. The molecular weights of the polymers were determined by measurement of the intrinsic viscosity of the polymers in methyl ethyl ketone at 30° C.

The present process is carried out under relatively low temperatures. That is to say, temperatures of from about −40° C. to −100° C. may be utilized, with the preferred range from about −50° C. to −75° C. Preferably atmospheric pressure is used, but it is also possible to use subatmospheric or superatmospheric pressures without substantially detracting from the efficacy of the instant process.

The present process can be carried out either with or without a solvent being present. When the delayed addition technique, mentioned hereinabove, is utilized (Examples 1 and 3) a non-solvent for the monomers and polymers at the polymerization temperature, must be used. Examples of solvents for the catalyst which may be used in this technique are the aliphatic hydrocarbons such as pentane, hexane, heptane and the like. Generally, any material which is a solvent for the catalyst and a non-solvent for the monomer and polymer may be used.

Additionally, the polymerization may be carried out in bulk (Examples 2 and 4) wherein no solvent at all need be used.

Finally, solution polymerizations may also be utilized to polymerize the disclosed monomers. Suitable solvents useful in this type of treatment include toluene, aliphatic alcohols (i.e., methanol), ether, methyl ethyl ketone, methylmethacrylate and the like. Generally, any material which is a solvent for the monomer, polymer and catalyst may be used.

The pH of the system undergoing reaction, according to the process of the present invention, is not critical. However, it is preferred that the system be neutral, that is to say, a pH of about 6 to 8 is considered most advantageous.

The reaction is preferably carried out in the presence of an inert gas blanket so as to keep the oxygen content of the reaction vessel at a minimum. Various inert gases such as nitrogen, carbon dioxide, argon, neon, propane and the like may be used for this purpose.

As mentioned above, the polymerization of the monomer is relatively instantaneous and therefore the contact time of the reactants is not critical. However, it is preferred that the reaction be allowed to proceed for a period of time of about 15 minutes to about 24 hours in order to insure high conversion.

As previously discussed, the monomer is added to the catalyst solution very slowly while the catalyst solution is undergoing vigorous agitation. If the agitation is omitted, the reaction rate is slower and higher molecular weight polymers are not obtained. However, agitation can be omitted when the lower molecular weight polymers are desired.

As mentioned above, the crux of the instant invention lies in our discovery that certain tertiary phosphines, having a pKa of at least about 8.0, can be used as catalysts to initiate the polymerization of those specific monomers mentioned above. We have found that tertiary phosphines having a pKa of below about 8.0 will not initiate the polymerization of those monomers. As can be seen from the following examples, certain well known and widely used tertiary phosphine formaldehyde polymerization catalysts are inoperable in respect to the instant monomers as are other catalysts which are known to polymerize formaldehyde. Examples of the tertiary phosphines which we contemplate as useful in the present invention, and therefore have a pKa of at least about 8.0, are ethyldimethyl phosphine, methyldiethyl phosphine, triisobutyl phosphine, tripropyl phosphine, tributyl phosphine, triamyl phosphine, trimethyl phosphine, triethyl phosphine, di-n-butoxyethyl phosphine, 1-methyl phosphorinane and the like.

According to the present invention, only those tertiary phosphines may suitably be employed which have a pKa value of at least about 8.0. The pKa value, as the term is employed in the present invention, refers to the acid strength and not to the acid capacity of the catalyst. This pKa is obtained by measurement of the protonated or unprotonated species in water. It is an equilibrium concept which signifies the relative strength of the acid or base under consideration. In the present invention, the higher the pKa, the more basic the tertiary phosphine.

The resinous polymers synthesized, exhibit appreciable tackiness when they are of a relatively low molecular weight while the higher molecular weight products are rubbery materials. These resinous products may be used in such applications as adhesives, impact modifiers and coating compositions.

The following examples are for purposes of illustration only and are not to be construed as limitations on the present invention except as set forth in the amended claims. All parts are parts by weight unless otherwise indicated.

*Example 1*

Into a suitable reaction vessel, equipped with stirrer and gas inlets and outlets, are added 44 parts of pentane and 0.13 part of tributyl phosphine (pKa 8.43). The solution is vigorously agitated and 11.7 parts of acetaldehyde, freshly prepared from the decomposition of paraldehyde, are added dropwise over a period of 1 hour. The reaction mixture is stirred for an additional hour at a temperature of $-75°$ C. A slow stream of nitrogen is passed through the system during the polymerization. The polymer begins to form almost instantaneously and since it is insoluble in pentane, begins to settle to the bottom of the reaction vessel. The polymer is recovered by filtration of the reaction mixture and is then washed with salt water at $0°$ C. About 3.5 parts of the resinous polymer is recovered corresponding to a 30% conversion. Infrared analysis of the polymer shows a strong ether band, no carbonyl groups and only a trace of hydroxyl groups. The intrinsic viscosity of the resin in methyl ethyl ketone at $30°$ C. is 0.124.

*Example 2*

Dry phenylacetaldehyde (5.1 parts) is charged into a suitable reaction vessel, equipped with catalyst inlet and stirrer, and a stream of dry nitrogen is bubbled therethrough for five minutes. The charge is cooled to $-55°$ C. and 0.067 part of triamyl phosphine (pKa 8.33) catalyst are added after sealing the vessel. The solution becomes extremely viscous after five minutes of reaction. After 2½ hours, the reaction stops and solid polymer of phenylacetaldehyde is recovered in a yield of 70%. The intrinsic viscosity of the polymer, measured in methyl ethyl ketone at $30°$ C. is 0.08.

*Example 3*

Propionaldehyde is carefully dried over anhydrous $MgSO_4$ and distilled under nitrogen at $48°$ C. 8.1 parts of this dry propionaldehyde are added to a suitable reaction vessel, equipped as in Example 2, containing a vigorously agitated solution of 44 parts of pentane and 0.14 part of tripropyl phosphine (pKa 8.64) at $-75°$ C. The addition is completed in thirty minutes and the resulting solution is agitated for an additional two hours. The precipitated polymer is then recovered in a yield of 25%. The intrinsic viscosity of the resin, in methyl ethyl ketone at $30°$ C., is 0.11.

*Example 4*

Pure, dry acetaldehyde is charged to a suitable reaction vessel and a stream of dry nitrogen is bubbled therethrough for 10 minutes. The vessel is sealed and 0.4 part of an ether solution containing 0.14 part of phenyldimethyl phosphine (pKa 6.49) is added through the catalyst inlet. The solution was stirred at $-75°$ C. for 16 hours. The viscosity of the solution does not build-up and no polymer is produced.

*Example 5*

Pure, dry acetaldehyde (5 parts) is added to a suitable reaction vessel and cooled to $-75°$ C. with agitation. 0.1 part of triphenyl phosphine (pKa 2.73) are added to the vessel and agitated for eighteen hours. No solution viscosity build-up is observed and no polymer is produced.

*Example 6*

5.1 parts of pure, dry phenylacetaldehyde are charged to a suitable reaction vessel and dry nitrogen is bubbled therethrough. The charge is cooled to $-55°$ C. and 0.2 part of an ether solution containing 0.07 part of triphenyl phosphine (pKa 2.73) are added thereto. The solution was agitated for 16 hours. No solution viscosity build-up is observed, and no polymer is produced.

*Example 7*

Utilizing the procedure of Example 1, above, 0.13 part of triethyl amine is substituted for the tributyl phosphine and the resulting solution is cooled to $-75°$ C. and agitated. After 16 hours of agitation no polymer results.

We claim:

1. A process for the polymerization of an aldehyde which comprises contacting a substantially pure aldehyde having the formula

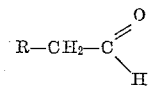

wherein R is a substituent selected from the group consisting of hydrogen, an aliphatic, linear, alkyl radical having 1 to 6 carbon atoms and an unsubstituted phenyl radical, with a tertiary phosphine catalyst having a pKa of at least about 8.0 at a temperature of from about $-40°$ C. to about $-100°$ C. with vigorous agitation.

2. A process for the polymerization of an aldehyde which comprises contacting a substantially pure aldehyde having the formula

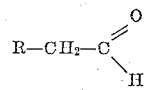

wherein R is a substituent selected from the group consisting of hydrogen, an aliphatic linear, alkyl radical having 1 to 6 carbon atoms and an unsubstituted phenyl radical, with triamyl phosphine at a temperature of from about $-40°$ C. to about $-100°$ C. with vigorous agitation.

3. A process for the polymerization of acetaldehyde comprising contacting substantially pure monomeric acetaldehyde with a tertiary phosphine catalyst having a pKa of at least about 8.0, at a temperature of from about −40° C. to about −100° C., with vigorous agitation.

4. A method for the polymerization of acetaldehyde comprising contacting substantially pure monomeric acetaldehyde with tripropyl phosphine at a temperature of from about −40° C. to about −100° C. with vigorous agitation and in the presence of an organic solvent which is a solvent for said phosphine and a non-solvent for said acetaldehyde and the polymer thereof.

References Cited in the file of this patent

UNITED STATES PATENTS

| | | |
|---|---|---|
| 2,675,372 | Coover et al. | Apr. 13, 1954 |
| 2,768,994 | MacDonald | Oct. 30, 1956 |
| 2,828,286 | MacDonald | Mar. 25, 1958 |
| 3,054,775 | Hodes et al. | Sept. 18, 1962 |

OTHER REFERENCES

Carruthers et al.: Trans., Faraday Soc., volume 32 (1936), pages 195–208.